Patented June 26, 1934

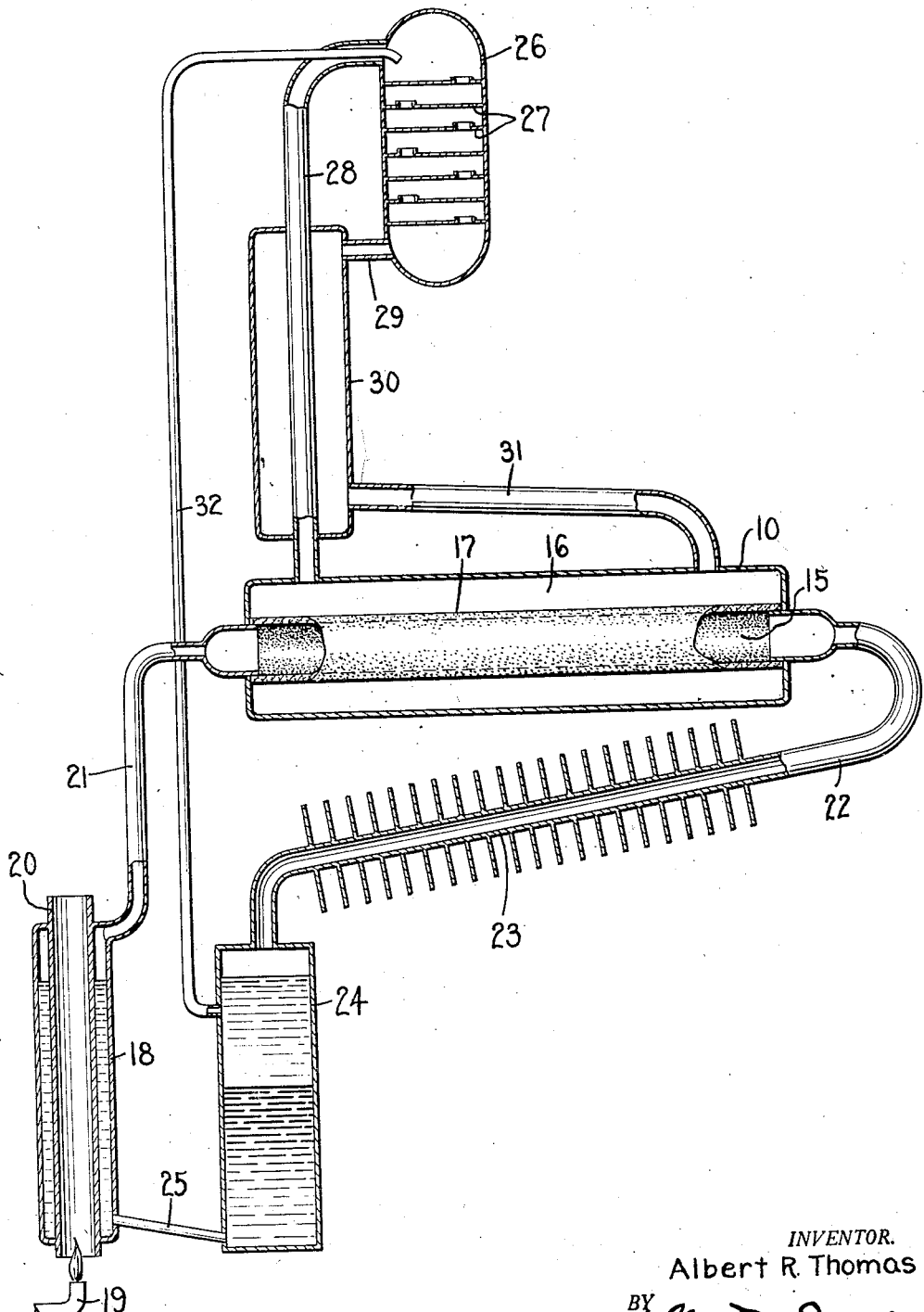

1,964,391

UNITED STATES PATENT OFFICE 1,964,391

REFRIGERATING SYSTEM

Albert R. Thomas, New York, N. Y., assignor to Electrolux Servel Corporation, New York, N. Y., a corporation of Delaware Application September 18, 1931, Serial No. 563,587

11 Claims. (Cl. 62—119.5)

This invention relates to refrigerating systems of the hermetically sealed equalized pressure type in which liquid refrigerant is evaporated into an inert gas.

An object of this invention is to provide a refrigerating system of this type that requires no liquid circulation. A system contemplated by this invention contains a refrigerant that is evaporated into an inert gas to produce cooling, a membrane in which the refrigerant is soluble, and a working fluid into which the refrigerant gas passes through the membrane out of the mixture of refrigerant and inert gases. The fluids used must be chemically inert with respect to each other.

This invention will be more fully understood by reference to the following description taken in connection with the accompanying drawing which shows a refrigerating apparatus contemplated by this invention.

Referring to the drawing, a separator or diffusion cell 10 comprises a chamber 15 and chamber 16 separated by a membrane 17 which, as shown, may be in the form of a tube extending through a closed cylindrical vessel. A boiler 18 heated by a burner 19 in a flue 20 is connected from its upper portion through conduit 21 to one end of the chamber 15 in cell 10. The other end of chamber 15 is connected through conduit 22 to a condenser 23 which discharges into the upper end of a standpipe or receiver 24. The lower end of the receiver is connected through conduit 25 to the lower part of the boiler 18. Receiver 24 and boiler 18 connected between their lower ends by conduit 25 form a U-tube liquid trap in a circuit comprising the boiler, chamber 15 in cell 10, condenser 23, and receiver 24.

An evaporator 26 constructed as well known in the art with baffle plates 27, has its upper portion connected through conduit 28 to one end of chamber 16 in the cell 10 and its lower portion connected through conduits 29, 30, and 31 to the other end of chamber 16. Conduits 28 and 30 are arranged concentrically in heat exchange relation for the purpose hereinafter explained. A riser conduit 32 leading from the upper part of the receiver 24 opens into the upper part of the evaporator 26.

According to this invention there is utilized a working fluid and refrigerant which are immiscible in the liquid phase and an inert auxiliary gas. The membrane 17 in the cell 10 is of some material in which only the refrigerant is soluble, for instance, a tube of fibrous material, such as paper or cloth impregnated with oil, such as a good grade of mineral oil, in which case water may be used as the working fluid, butane as the refrigerant, and hydrogen as the auxiliary gas.

Water in the boiler 18 is vaporized by the application of heat, the vapor flowing through conduit 21 into chamber 15 of cell 10 on one side of the membrane 17. Liquid butane entering the evaporator 26 through conduit 32, as hereinafter explained, flows downwardly over the baffle plates 27 evaporating into hydrogen which enters the evaporator through conduit 28. The resulting gas mixture being heavier than the pure hydrogen, flows downwardly through conduits 29, 30, and 31 into chamber 16 of the cell 10 in which it flows on one side of the membrane 17 in the opposite direction from the water vapor flowing on the opposite side in chamber 15. The butane gas which is soluble in the membrane 17 passes through the latter into the water vapor and the hydrogen returns to the evaporator through conduit 28 in heat exchange relation with the cool gas mixture from the evaporator flowing downwardly through conduit 30 thereby entering the evaporator at a lower temperature than if no heat exchange were effected.

The water vapor and butane gas which has passed through the membrane 17 flow through conduit 22 into condenser 23 where both are liquefied, the liquid discharging into receiver 24 in which the butane being of less specific gravity than the water stratifies and floats on the latter. The water returns from the receiver to the boiler 18 through conduit 25. Due to the passage of butane gas through the membrane 17 a difference in pressure is set up on both sides of the membrane, which pressure difference is equalized through conduit 32 which extends from the upper part of receiver 24 to the evaporator 26. The liquid standing in receiver 24 with the butane on top acts as a seal so that liquid butane is forced up conduit 32 into the evaporator 26. In other words, the liquid column standing in conduit 32 balances the difference in pressures ceated on each side of the membrane due to the passage of butane therethrough.

It will be obvious to those skilled in the art that various other changes may be made in the construction and arrangement without departing from the spirit of the invention and therefore the invention is not limited to what is described in the specification and shown in the drawing but only as indicated in the appended claims.

I claim:

1. Refrigerating apparatus comprising a cell consisting of two chambers separated by a porous partition impregnated with oil, a circuit comprising a boiler, one chamber of said cell, a condenser, and a receiver orbitly connected and containing water, a second circuit comprising an evaporator and the other chamber of said cell orbitly connected and containing hydrogen, a charge of butane in the system, and a conduit from the upper part of said receiver to said evaporator.

2. Refrigerating apparatus comprising a cell consisting of inner and outer chambers formed by a porous tube impregnated with oil and extending lengthwise through a closed elongated vessel, a circuit comprising a boiler, the inner chamber of said cell, a condenser, and a receiver orbitly connected and containing water, a second circuit comprising an evaporator and the outer chamber of said cell orbitly connected and containing hydrogen, a charge of butane in the system, and a conduit from the upper part of said receiver to said evaporator.

3. Refrigerating apparatus comprising a cell consisting of inner and outer chambers formed by a tube of fibrous material impregnated with oil and extending lengthwise through a horizontal cylindrical vessel, a boiler containing water and connected from its upper portion to one end of the inner chamber of said cell, a receiver connected from its lower portion to the lower end of said boiler, a condenser connected between the other end of said inner chamber and the upper end of said receiver, an evaporator connected in a closed circuit with the outer chamber of said cell, a conduit from the upper part of said receiver to said evaporator, a charge of hydrogen in said evaporator circuit, and a charge of butane in the system.

4. A refrigerating apparatus comprising a cell divided by a porous partition impregnated with oil, a circuit including one part of said cell and containing hydrogen, means for evaporating butane in said hydrogen circuit, and means for circulating water vapor through the other part of said cell.

5. Refrigerating apparatus comprising two closed fluid circuits, a porous partition impregnated with oil, between and forming a common closure for a part of each circuit, hydrogen in the first of said circuits, means for evaporating liquid butane into said hydrogen, means for circulating water vapor past said membrane in the second of said circuits, and means utilizing the pressure due to the passage of butane through said oil film for returning the latter in liquid form from the second to the first of said circuits.

6. The method of refrigerating which comprises evaporating liquid butane into hydrogen, conducting the resulting gas mixture in contact with one side of an oil impregnated wall of porous material, conducting water vapor in contact with the other side of said wall, liquefying the water vapor and the butane which passes through the oil film, removing the liquid butane from the water, and again evaporating the liquid butane.

7. The method of refrigerating which comprises evaporating liquid refrigerant into an inert gas in an evaporator, conducting the resulting gas mixture in contact with one side of a membrane permeable only to the refrigerant, conducting a working vapor chemically inert to and immiscible in the liquid phase with the refrigerant in contact with the other side of said membrane, liquefying by condensation the working fluid and refrigerant which passes through the membrane, and utilizing the pressure difference due to the passage of refrigerant through the membrane to return the liquefied refrigerant to said evaporator.

8. The method of refrigerating which comprises evaporating liquid refrigerant into an inert gas, moving refrigerant from the resulting gas mixture by diffusion through a membrane into a circulating fluid vapor chemically inert to and immiscible in the liquid phase with the refrigerant, separating the refrigerant and said fluid by condensation, and utilizing the pressure difference due to the diffusion of refrigerant through the membrane to remove the separated liquid refrigerant from said fluid.

9. The method of refrigerating which comprises circulating an inert gas in a closed circuit, circulating a working fluid by vaporization and condensation in a second closed circuit, evaporating liquid refrigerant into the inert gas in one portion of said first circuit, transferring refrigerant gas from the first circuit to the vapor phase portion of the second circuit by diffusion through a membrane in which the refrigerant is soluble, liquefying refrigerant in the second circuit, and utilizing the pressure difference due to the passage of refrigerant through the membrane to return liquid refrigerant from the second circuit to the first circuit.

10. In the method of refrigeration which includes evaporating liquid refrigerant into an inert gas, separating the refrigerant from the gas by diffusion through a membrane permeable only to the refrigerant, and condensing the refrigerant to liquid, the step which comprises utilizing osmotic pressure to raise the condensed refrigerant back into the presence of the inert gas.

11. In the method of refrigeration with a system in which liquid refrigerant is evaporated into an inert gas, the refrigerant separated from the gas by diffusion through a membrane permeable only to the refrigerant, and the separated refrigerant condensed to liquid, that improvement which comprises utilizing the osmotic pressure to cause flow of liquid refrigerant in the system.

ALBERT R. THOMAS.